(12) United States Patent
Zhao et al.

(10) Patent No.: US 11,866,051 B2
(45) Date of Patent: Jan. 9, 2024

(54) SYSTEMS AND METHODS FOR FUSING ROAD FRICTION TO ENHANCE VEHICLE MANEUVERING

(71) Applicant: Volvo Car Corporation, Gothenburg (SE)

(72) Inventors: Minming Zhao, Mountain View, CA (US); Sohini Roy Chowdhury, Santa Clara, CA (US)

(73) Assignee: VOLVO CAR CORPORATION, Gothenburg (SE)

( * ) Notice: Subject to any disclaimer, the term of this patent is extended or adjusted under 35 U.S.C. 154(b) by 282 days.

(21) Appl. No.: 17/079,892

(22) Filed: Oct. 26, 2020

(65) Prior Publication Data
US 2022/0126833 A1 Apr. 28, 2022

(51) Int. Cl.
- *B60W 40/068* (2012.01)
- *B60W 30/09* (2012.01)
- *B60W 30/095* (2012.01)
- *G06N 20/00* (2019.01)

(52) U.S. Cl.
CPC .......... *B60W 40/068* (2013.01); *B60W 30/09* (2013.01); *B60W 30/0956* (2013.01); *G06N 20/00* (2019.01); *B60W 2520/26* (2013.01); *B60W 2552/40* (2020.02); *B60W 2554/00* (2020.02)

(58) Field of Classification Search
None
See application file for complete search history.

(56) References Cited

U.S. PATENT DOCUMENTS

| 6,574,559 B2 | 6/2003 | Shinmura et al. |
| 9,475,500 B2 | 10/2016 | Grimm et al. |
| 9,514,647 B2 | 12/2016 | Moshchuk et al. |

(Continued)

FOREIGN PATENT DOCUMENTS

| DE | 102017209258 A1 * | 12/2018 |
| WO | 2009092373 A1 | 7/2009 |

(Continued)

OTHER PUBLICATIONS

Machine translation of DE102017209258A1 (Year: 2022).*
Mar. 2, 2022 European Search Report issued in corresponding International Application No. 21202092.

*Primary Examiner* — Isaac G Smith
*Assistant Examiner* — Jennifer M Anda
(74) *Attorney, Agent, or Firm* — Clements Bernard Walker; Christopher L. Bernard

(57) ABSTRACT

A vehicle control method and system, including: receiving road friction information indicating road friction estimates for a plurality of regions surrounding the vehicle; detecting and determining a predicted trajectory for an object within the plurality of regions surrounding the vehicle; wherein the predicted trajectory for the object is determined based in part on the road friction estimates for the plurality of regions surrounding the vehicle; and modifying operation of the vehicle based on the predicted trajectory for the object. The predicted trajectory for the object is determined based in part on a risk map for the plurality of regions surrounding the vehicle that is generated from a road friction map for the plurality of regions surrounding the vehicle.

20 Claims, 8 Drawing Sheets

(56) References Cited

U.S. PATENT DOCUMENTS

| | | | |
|---|---|---|---|
| 2016/0133131 A1* | 5/2016 | Grimm | G08G 1/0112 |
| | | | 701/117 |
| 2018/0222462 A1 | 8/2018 | Varnhagen | |
| 2019/0111932 A1 | 4/2019 | Falconer et al. | |
| 2020/0238999 A1* | 7/2020 | Batts | E01C 23/01 |
| 2020/0290625 A1* | 9/2020 | Berntorp | B60W 40/068 |
| 2021/0065551 A1* | 3/2021 | Manohar | G08G 1/0129 |
| 2021/0125078 A1* | 4/2021 | Malhan | G06F 40/56 |

FOREIGN PATENT DOCUMENTS

| | | |
|---|---|---|
| WO | 2011067009 A1 | 6/2011 |
| WO | 2020079037 A1 | 4/2020 |

* cited by examiner

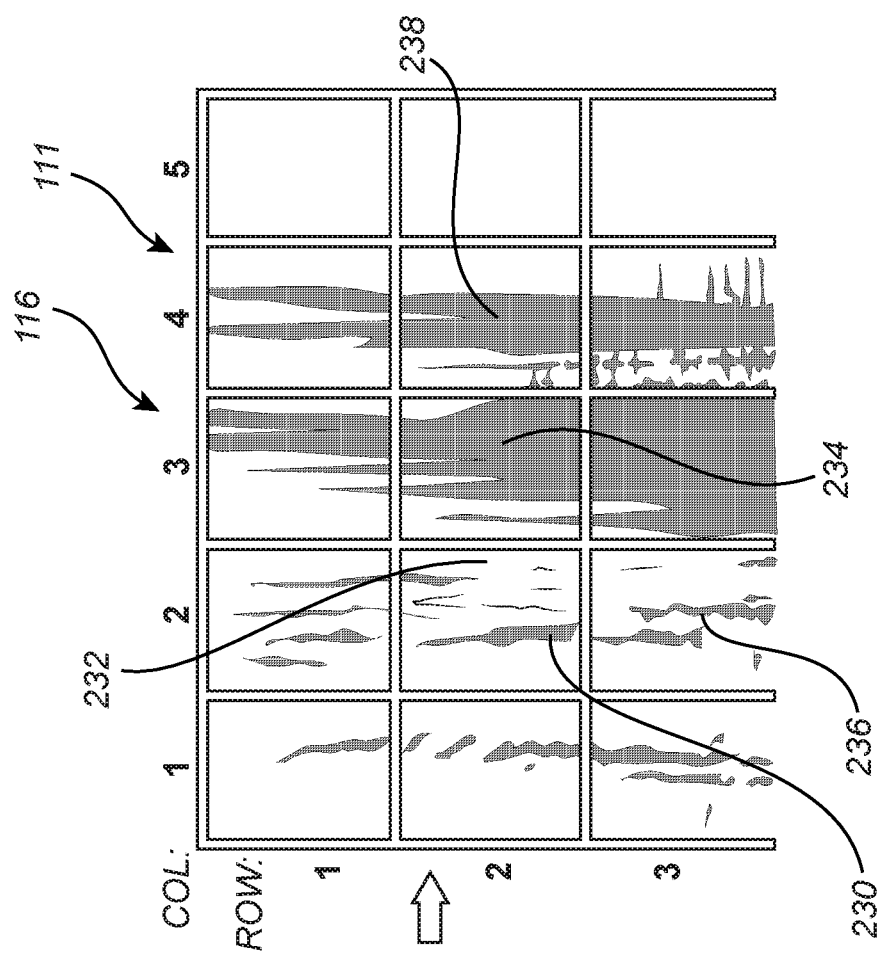
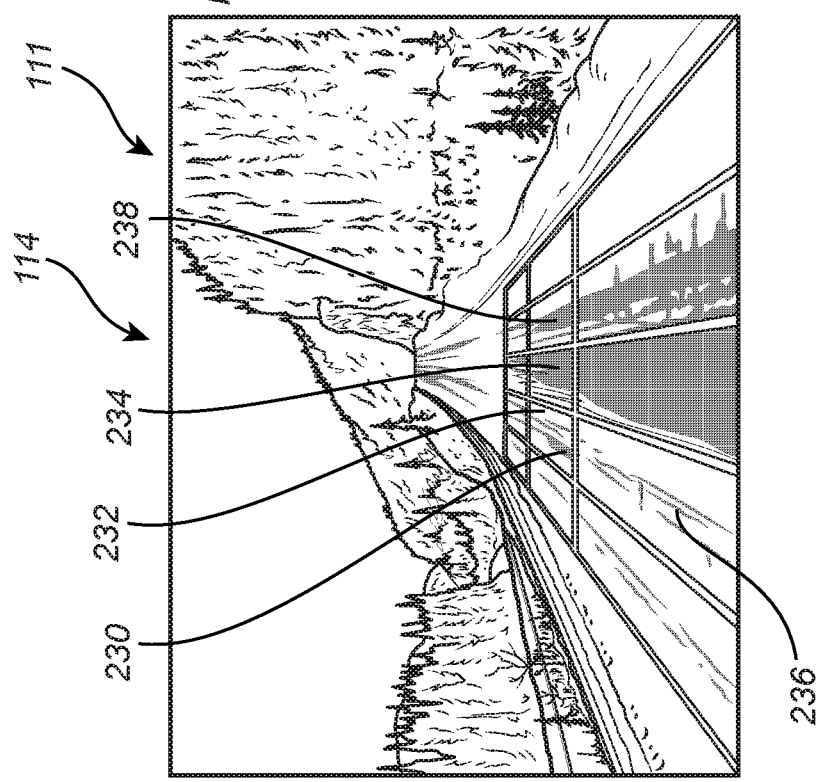
FIG. 2

SYSTEMS AND METHODS FOR FUSING ROAD FRICTION TO ENHANCE VEHICLE MANEUVERING

TECHNICAL FIELD

The present disclosure relates generally to the automotive field. More particularly, the present disclosure relates to systems and method for fusing road friction information with road user intentions for enhanced vehicle maneuvering.

BACKGROUND

Existing sensor, camera, and cloud-based methods and modules for road friction estimation (RFE), including those that utilize machine learning (ML) methods, focus on utilizing RFEs for ego vehicle maneuvers, via driver assistance (DA) and autonomous driving (AD) systems, specifically without considering other road user intentions. Here, "ego vehicle" refers to a vehicle itself, as opposed to surrounding vehicles. These DA and AD systems plan and execute such ego vehicle maneuvers based on how the expected road condition will affect the response to the ego vehicle. The ego vehicle maneuvers are often responsive to the presence or actions of another road user, such as another vehicle, a cyclist, a pedestrian, etc., but do not currently take the intentions of such other road user into account as it relates to RFE.

This background is provided as illustrative contextual environment only. It will be readily apparent to those of ordinary skill in the art that the systems and methods of the present disclosure may be implemented in other contextual environments as well.

SUMMARY

The present disclosure fuses road friction information with other road user intentions to enhance safety constraint calculations and ego vehicle control and maneuvers, as implemented by DA and AD systems, thereby providing more adaptive, safer, and smoother ego vehicle control and maneuvers, in terms of steering, braking, and acceleration. The input to the methods and system of the present disclosure include predictive local road friction information, such as a RFE "map", and predictive motion trajectories of other road users, based on perception (e.g., vision) sensor-based methodologies related to object speed, trajectory, travel time, motion probabilities, slippage probabilities, etc. The output from the methods and system is a vehicle maneuver control signal with enhanced safety constraints.

In one illustrative embodiment, the present disclosure provides an ego vehicle control method, including: receiving road friction information indicating road friction estimates for a plurality of regions surrounding the ego vehicle; detecting and determining a predicted trajectory for an object within the plurality of regions surrounding the ego vehicle; wherein the predicted trajectory for the object is determined based in part on the road friction estimates for the plurality of regions surrounding the ego vehicle; and modifying operation of the ego vehicle based on the predicted trajectory for the object. Receiving the road friction information includes using the road friction estimates for the plurality of regions surrounding the ego vehicle to generate a road friction map of the plurality of regions surrounding the ego vehicle. Determining the predicted trajectory for an object within the plurality of regions surrounding the ego vehicle includes fusing the road friction map with an object map of the plurality of regions surrounding the ego vehicle to form a risk map of the plurality of regions surrounding the ego vehicle. The predicted trajectory for the object is determined based in part on the risk map for the plurality of regions surrounding the ego vehicle.

In another illustrative embodiment, the present disclosure provides a non-transitory computer-readable medium including ego vehicle control instructions stored in a memory and executed by a processor to carry out the steps including: receiving road friction information indicating road friction estimates for a plurality of regions surrounding the ego vehicle; detecting and determining a predicted trajectory for an object within the plurality of regions surrounding the ego vehicle; wherein the predicted trajectory for the object is determined based in part on the road friction estimates for the plurality of regions surrounding the ego vehicle; and modifying operation of the ego vehicle based on the predicted trajectory for the object. Receiving the road friction information includes using the road friction estimates for the plurality of regions surrounding the ego vehicle to generate a road friction map of the plurality of regions surrounding the ego vehicle. Determining the predicted trajectory for an object within the plurality of regions surrounding the ego vehicle includes fusing the road friction map with an object map of the plurality of regions surrounding the ego vehicle to form a risk map of the plurality of regions surrounding the ego vehicle. The predicted trajectory for the object is determined based in part on the risk map for the plurality of regions surrounding the ego vehicle.

In a further illustrative embodiment, the present disclosure provides an ego vehicle control system, including: a friction estimation/prediction module operable for receiving road friction information indicating road friction estimates for a plurality of regions surrounding the ego vehicle; an object detection and tracking module operable for detecting and determining a predicted trajectory for an object within the plurality of regions surrounding the ego vehicle; wherein the predicted trajectory for the object is determined based in part on the road friction estimates for the plurality of regions surrounding the ego vehicle using a motion estimation and intention prediction module; and a decision-making module operable for modifying operation of the ego vehicle based on the predicted trajectory for the object. Receiving the road friction information includes using the road friction estimates for the plurality of regions surrounding the ego vehicle to generate a road friction map of the plurality of regions surrounding the ego vehicle. Determining the predicted trajectory for an object within the plurality of regions surrounding the ego vehicle includes fusing the road friction map with an object map of the plurality of regions surrounding the ego vehicle to form a risk map of the plurality of regions surrounding the ego vehicle. The predicted trajectory for the object is determined based in part on the risk map for the plurality of regions surrounding the ego vehicle.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a series of images illustrating patch segmentation and bird's-eye-view (BEV) transformation steps, respectively, of the illustrative method for generating the RFE of FIG. 1;

DESCRIPTION OF ILLUSTRATIVE EMBODIMENTS

Again, the present disclosure fuses road friction information with other road user intentions to enhance safety constraint calculations and ego vehicle control and maneuvers, as implemented by DA and AD systems, thereby providing more adaptive, safer, and smoother ego vehicle control and maneuvers, in terms of steering, braking, and acceleration. The input to the methods and system of the present disclosure include predictive local road friction information, such as a RFE "map", and predictive motion trajectories of other road users, based on perception (e.g., vision) sensor-based methodologies related to object speed, trajectory, travel time, motion probabilities, slippage probabilities, etc. The output from the methods and system is a vehicle maneuver control signal with enhanced safety constraints.

In accordance with the systems and methods of the present disclosure, any number of RFE techniques may be exploited. By way of example only, one such RFE technique generates and utilizes a RFE indicating the expected friction level between a road surface and the tires of a vehicle based on forward looking camera images and signal processing. A forward-looking camera image is pre-processed, patch segmented (both laterally and longitudinally, as defined by wheel tracks or the like), transformed into a BEV image to provide easy-to-process patches of the drivable surface ahead of the vehicle, patch quantized, and finally classified for RFE. The resulting RFE may otherwise be used to provide driver information, automatically control the ego vehicle's motion, and/or inform a cloud-based alert service to enhance global driver safety. This RFE inherently includes a temporal component that alerts a driver and/or causes a vehicular response to hazardous driving conditions prior to such conditions being encountered by the vehicle and driver. This provides predictive leverage. The methods and systems of the present disclosure may be integrated with the operation of other conventional on-vehicle sensors and systems, such as those providing braking/acceleration, lateral/longitudinal movement, and/or torque control. The methods and systems have improved accuracy, increased availability (even when pronounced tire forces are not present), and enhanced predictive ability, while operating efficiently with relatively low computational complexities as compared to other image-based road surface condition (RSC) classification models.

Figure 1:
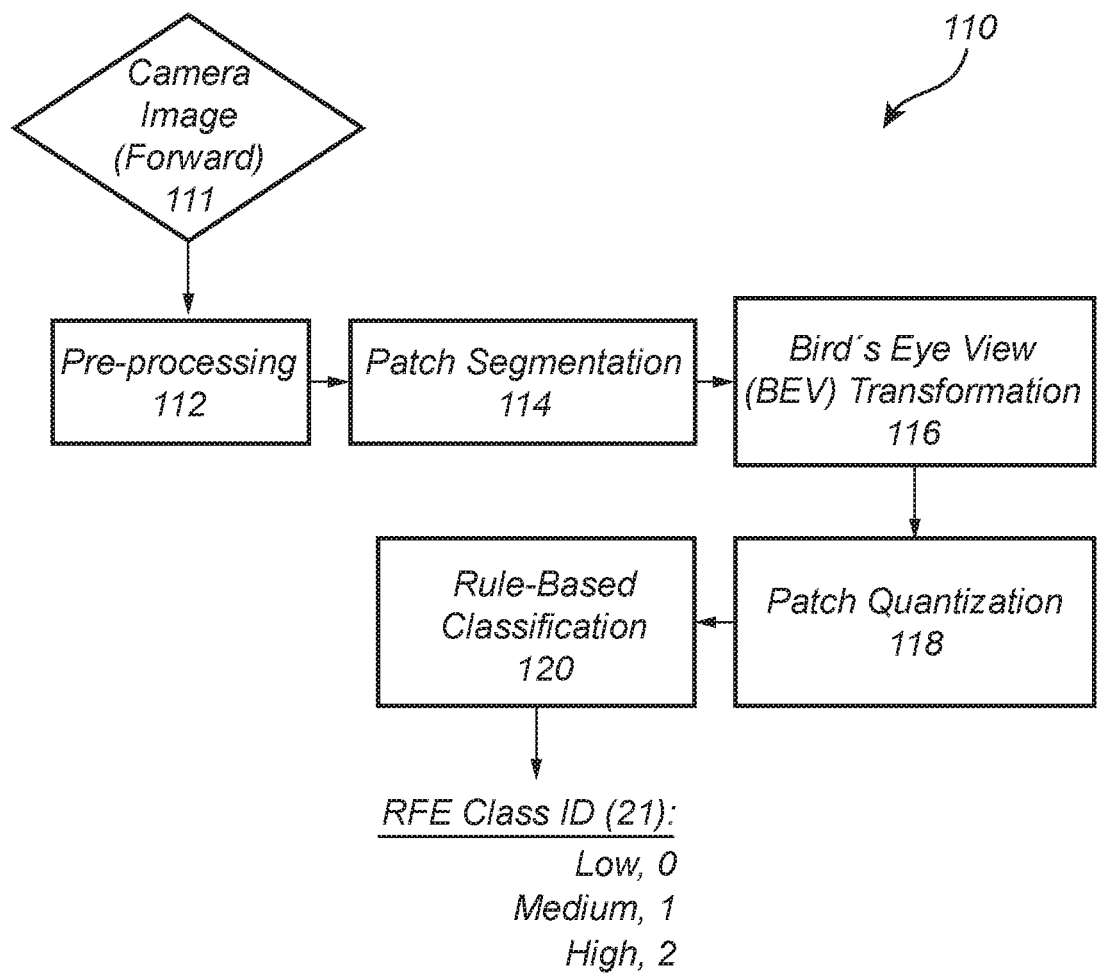
FIG. 1 is a flowchart illustrating one illustrative method for generating a RFE that may be utilized with the fusion systems and methods of the present disclosure.

Referring to FIG. 1, the illustrative RFE generation method 110 includes the following steps, each of which is executed by a processor, such as an on-vehicle electronic control unit (ECU) or the like: pre-processing 112, patch segmentation 114, BEV transformation 116, patch quantization 118, and classification 120. These steps each operate on an image 111 that is preferably obtained from an on-vehicle forward looking camera or the like that has visibility for a given distance in front of a vehicle, for example 50 meters.

The image 111 is first pre-processed. In this pre-processing step 112, the image 111 is broadly classified into a dry/wet/snow/slush/etc. RSC classification may be performed using any novel or conventional methodology known to those of ordinary skill in the art. For example, the image 111 may be classified into a given RSC using a ML/deep learning (DL) or neural network (NN) methodology that analyzes color/texture differences between a road surface, the sky, and the surrounding environment. This helps to remove selected images from further RFE processing. For example, if the image 111 can be immediately classified as "dry," then further patch segmentation, quantization, and classification is not required as all patches are homogeneous and represent a high RFE. An image 111 that is not immediately classifiable as "dry" with a predetermined degree of confidence, for example, advances to further RFE processing.

The pre-processed image 111 is next patch segmented, as illustrated in FIG. 2. In this patch segmentation step 114, the image 111, and specifically the road surface depicted in the image 111, is divided into discrete regions via lateral (i.e., horizontal) lines 230 and longitudinal (i.e., vertical) lines 232, forming an m×n patch matrix 234 over the road surface. Because the image 111 is obtained from a forward-looking camera, it is a perspective image 121 with a vanishing point. Accordingly, the lateral lines 230 are substantially parallel, while the longitudinal lines 232 generally converge with distance from the camera. Here, a 5×3 patch matrix 234 is illustrated and used, although it will be readily apparent to those of ordinary skill in the art that other numbers of patches 236 (columns and rows) may be used equally. In this 5×3 patch matrix 234, columns 2 and 4 are configured to substantially correspond to and encompass the wheel tracks 238 depicted, while column 3 is configured to be substantially between the wheel tracks 238 depicted. Per U.S. convention, column 1 is adjacent to the oncoming traffic lanes and column 5 is adjacent to the shoulder. It is important, although not absolutely required, that enough rows are utilized to provide a temporal dimension to the generated RFE, with the image 111 depicting and sufficiently analyzing enough road surface that the vehicle has yet to encounter. Again, at least a 3×2 patch matrix 234 is preferred, with each patch 236 covering 1-2 m laterally and 10-15 m longitudinally, for example—providing adequate and variable road surface coverage and the aforementioned temporal dimension. Different camera fields-of-view, resolutions, and calibrations could dictate/allow for other dimensions to be utilized equally. Typically, the 5×3 patch matrix 234 provides 30-50 m of RFE distance. It should be noted that the image 111 may be a stitched image obtained from multiple cameras without substantially altering the processing steps described herein.

The pre-processed, patch segmented image 111 is next perspective transformed, as again illustrated in FIG. 2. In this perspective transformation step 116, the image 111, and specifically the road surface depicted in the image 111, already divided into discrete regions via lateral (i.e., horizontal) lines 230 and longitudinal (i.e., vertical) lines 232, forming an m×n patch matrix 234 over the road surface, is converted into an overhead, BEV image 111. Because the image 111 is originally obtained from a forward-looking camera, it is a perspective image 111 with a vanishing point. Accordingly, the lateral lines 230 are substantially parallel, while the longitudinal lines 232 generally converge with distance from the camera. As a result, pixel contributions proximate to the camera in the image 111 are enhanced, while pixel contributions remote from the camera in the image 111 are diminished. In the BEV transformed image 111, both the lateral lines 230 and the longitudinal lines 232 are substantially parallel, and perpendicular to one another. This promotes processing efficiency and equalizes pixel contributions. Again, here, a 5×3 patch matrix 234 is illustrated and used, although it will be readily apparent to those of ordinary skill in the art that other numbers of patches 236 (columns and rows) may be used equally. In this now "rectified" 5×3 patch matrix 234, columns 2 and 4 are still configured to substantially correspond to and encompass the wheel tracks 238 depicted, while column 3 is still configured to be substantially between the wheel tracks 238 depicted. Per U.S. convention, column 1 is still adjacent to the oncoming traffic lanes and column 5 is still adjacent to the shoulder. Again, it is important, although not absolutely required, that enough rows are utilized to provide a temporal dimension to the generated RFE, with the BEV transformed image 111 depicting and sufficiently analyzing enough road surface that the vehicle has yet to encounter. Again, at least a 3×2 patch matrix 234 is preferred, with each patch 236 covering 1-2 m laterally and 10-15 m longitudinally, for example—providing adequate and variable road surface coverage and the aforementioned temporal dimension. Different camera fields-of-view, resolutions, and calibrations could dictate/allow for other dimensions to be utilized equally. Typically, the 5×3 patch matrix 234 provides 30-50 m of RFE distance. It should be noted that the BEV transformed image 111 may be a stitched image obtained from multiple cameras without substantially altering the processing steps described herein. In practice, the above patch segmentation 114 may be applied before or after the BEV transformation 116, provided the same image hallmarks (e.g., the wheel tracks 238) are used.

The pre-processed, patch segmented, BEV transformed image 111 is next patch quantized. In this patch quantization step 118, a probability score is determined for each patch 236 and then each probability score is assigned one of a predetermined number of corresponding levels. The probability score is determined for each patch 236 by extracting a plurality (e.g., 26) color and textural features from that patch 236. Exemplary color and textural features include, but are not limited to, the mean and standard deviation of pixel intensities in the [R,G,B,H,S,V] planes with and without contrast enhancement and the mean and standard deviation of the histogram or oriented gradients (HOG) features extracted using a [16×16] block size, for example. Such methodologies are well known to those of ordinary skill in the art. This probability score determination outputs a probability score ($p\_i$) corresponding to the per-patch composition. A low probability score indicates a "dry" patch 236, while a high probability score indicates a "snowy" patch 236. Many methodologies could be used to generate these probability scores, such as a ML methodology, a logistic regression methodology, a NN methodology, etc. Next, the probability scores are each assigned one of a predetermined number of corresponding levels (e.g., 4) based on thresholds {0,th1,th2,th3,1} that can be empirically or experimentally determined. For example:

$s_i$=
1; $0 \le p_i \le th1$; => dry;
2; $th1 \le p_i \le th2$; => more dry, less snow;
3; $th2 \le p_i \le th3$; => more snow, less dry; and
4; $th3 \le p_i \le 1$; => snow, Thus, a lower probability score means a less snowy and drier patch in this construct. An "ice" patch would be identified as $s_i$=[2,3]. These patch quantization thresholds are empirically determined to maximize patch classification accuracy. Averages may also be computed for groups of patches, such as each column. A weighted average, mean, median, or the like could also be used to provide temporal distribution information, enabled by the use of multiple rows. It will be readily apparent to those of ordinary skill in the art that other classification schemes may be used equally.

Now that each patch 236 has a classified probability score, a classification step 120 (FIG. 1), such as a rule-based classification step, for example, is utilized in which a uniform friction value, the RFE, is formulated for the entire road surface depicted in the pre-processed, patch segmented, BEV transformed, patch quantized image 111. One exemplary rule, when rules are used, is based on calculating the weighted of all columns (1-5) of the matrix 234. For example, the uniform friction, $RFE_i$, =2 (i.e., high MUE) if the count of column average probability $<=th1$ is greater than 2. $RFE_i$, =1 (i.e., medium MUE) if the count of column average probability $<=th2$ and $>th1$ is greater than 2. $RFE_i$, =0 (i.e., low MUE) otherwise. It will be readily apparent to those of ordinary skill in the art that any classification methodology can be utilized equally, and all threshold values can be learned from larger training images/image sets using decision tree-based models and the like.

It should further be noted that, given a forward-looking camera in a vehicle, not every image frame has to be processed to obtain an accurate and useful RFE. For example, with a logging frame rate of about 30 frames per second, image frames may be processed every 3 or 4 seconds. This promotes processing efficiency. Further, patches 236 may be adaptive, adjusting to changing road surface sizes, orientations, and conditions. Importantly, the RFEs generated should be suitable use for vehicle control systems and cloud uploading once generated.

Again, any number of RFE techniques may be exploited in accordance with the systems and methods of the present disclosure. This road friction information is used in the form of a "map" along with other road user behavior predictions to effectively plan ego vehicle maneuvers. Several things must be taken into consideration. First, other vehicles are likely to adapt to the ego vehicle trajectory by following wheel tracks on a wet or snowy road. Second, other raid users that do not have access to the road friction information may engage in less-controlled maneuvers. For example, another vehicle in the vicinity of the ego vehicle may slip, a pedestrian may cross a slippery road more slowly and/or slip, etc. The ego vehicle must plan its maneuvers accordingly. Road friction and intention in a future time frame may thus be used as inputs for vehicle maneuver decision-making in terms of time to collision and safety distance. Third, for instances when there is disagreement between the predicted road user intention and an actual road user maneuver, the ego vehicle must automatically adapt to ensure adequate safety distance. Disagreements may imply differences in automotive processing systems and/or driver stress/risk levels. Fourth, if road friction information is globally available to all road users (other vehicles, cyclists, pedestrians, etc.), then other road user intention information is available with a higher degree of confidence, leading to increased availability, reliability, and safety. Fifth, a limiting condition may arise when vision sensors and/or RFE and/or intention prediction fail due to adverse weather conditions, etc., and manual driving interventions are warranted.

It should be noted that prior work has focused on tire-to-road friction property determination given fleet vehicle information and the like, as well as ego vehicle control based on instantaneous friction values (not "maps"), sometimes in view of object movements. Object behavior prediction has often been based on satellite imagery, roadside cameras, on-board global positioning system (GPS) data, and other vehicle sensor data, without regard to RFE fusion.

The algorithm of the present disclosure, however, includes four primary steps: (1) friction map generation; (2) object detection and tracking; (3) friction map-enhanced object motion estimation and intention prediction; and (4) DA/AD decision-making and control. The enhancement step is physics-based, in that it considers kinematics and dynamics, maneuver-based, in that it includes object maneuver intention prediction enhanced by friction information, and interaction awareness-based, in that interdependencies between road users and the ego vehicle are considered again enhanced by friction information. RFEs and road user intentions are fused, providing detours with time-to-travel changes.

Figure 3:
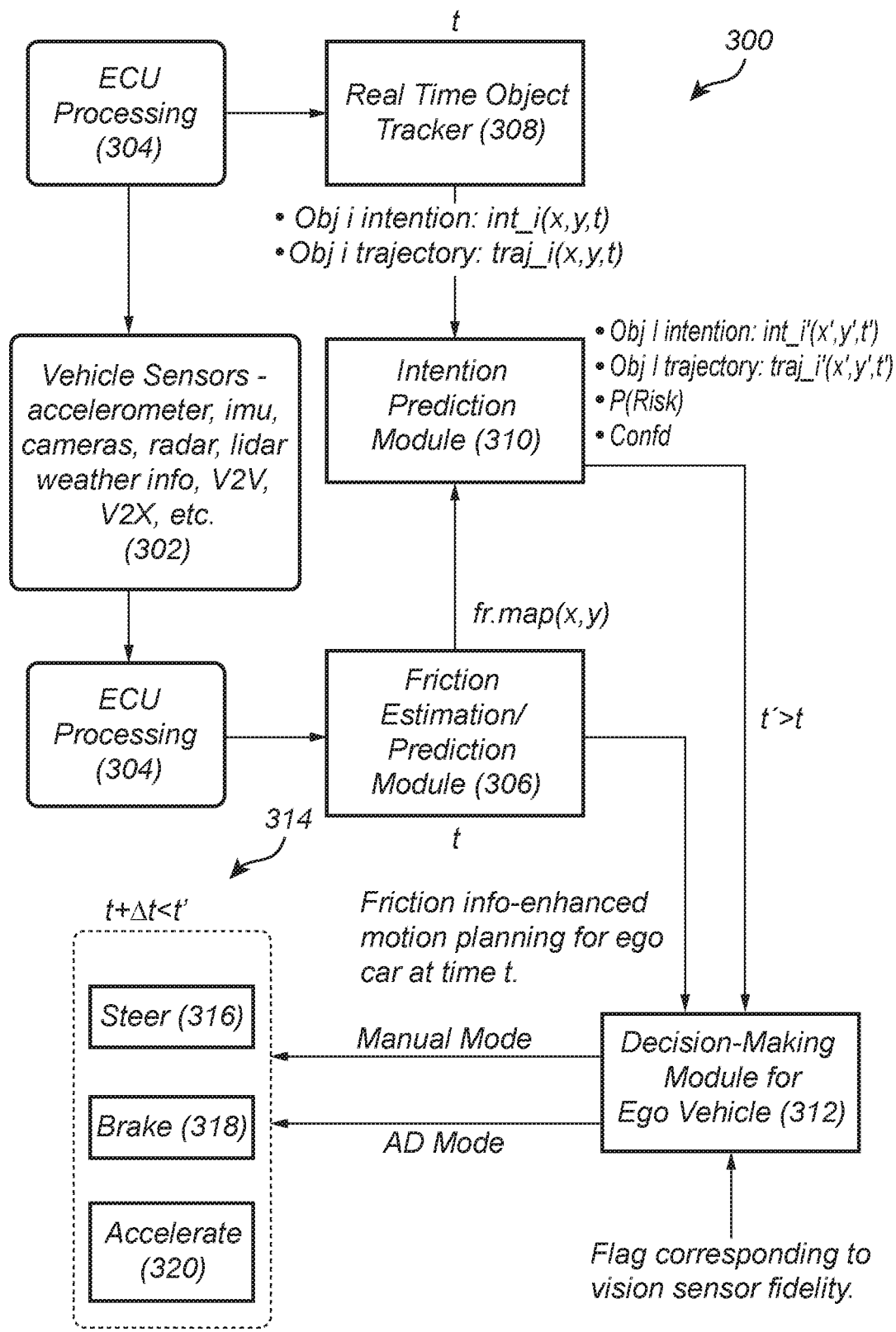
FIG. 3 is a schematic diagram of one illustrative embodiment of the road friction information-road user intention fusion method of the present disclosure.

Referring now specifically to FIG. 3, in one illustrative embodiment, the road friction information-road user intention fusion method 300 of the present disclosure includes leveraging the various vehicle sensor systems 302, such as accelerometers, inertial measurement units (IMUs), cameras, radar, lidar, aggregated weather data (AWD), vehicle-to-vehicle (V2V) data, vehicle-to-infrastructure (V2X) data, and the like, all of which communicate with the ego vehicle ECU processing systems 304. As is known to those of ordinary skill in the art, the various vehicle sensor data may be processed by a friction estimation/prediction module 306 to generate the friction map, fr.map(x,y), that highlights potentially slippery areas surrounding the ego vehicle at time t, via a variety of conventional and novel methodologies. As is also known to those of ordinary skill in the art, the various vehicle sensor data may be processed by a real time object tracker 308 to determine both an object intention at time t, int_i(x,y,t), and an object trajectory at time t, traj_i(x,y,t), via a variety of conventional and novel methodologies. This friction map and these object intentions and trajectories feed an intention prediction module 310, that determines a predicted object intention at later time t', int_i'(x',y',t'), and a predicted object trajectory at later time t', traj_i'(x',y',t'), based on a risk, P, and a confidence metric. The friction map is also used to enhance motion planning for the ego vehicle at time t. Thus, the friction map informs both ego vehicle maneuver control and ego vehicle maneuver planning with respect to other road users, which are also affected by the friction map. All of this into a decision-making module 312 for the ego vehicle, which receives flags corresponding to vehicle sensor fidelity, etc. The decision-making module 312 ultimately informs operation of the various vehicle control systems 314 at time t+Δt<t', such as steering systems 316, braking systems 318, and acceleration systems 320, in any of a manual mode, a DA mode, or an AD mode.

The object intention reflects the predicted intention of other road users at the applicable time, whereas the object trajectory reflects the predicted trajectory of other road users at the applicable time. The risk, P, reflects the probability that another road user is "safe" versus "risky," indicating an expected propensity to engage in significant behavior that must be accounted for. The confidence reflects a general certainty associated with the data utilized. For example, if the friction map is available to all parties, such that slippery conditions are known to all, then confidence is increased. If the friction map is available only to the ego vehicle, then confidence is decreased and other road users may be expected to act more erratically.

The friction map, fr.map(x,y), may be translated to a general riskiness grid, r(x,y), allowing risk for slippage and other erratic behavior to be accounted for, taking into account non-RFE risks as well as RFE risks (e.g., stationary potholes, debris in a road, and the like). Confidence in r(x,y) generally degrades with distance from the ego vehicle. For each object, r(x,y)+int_i(x,y,t) and traj_i(x,y,t) gives int_i' (x',y',t') and traj_i'(x',y',t'). One possible function involves a trajectory detour to account for a risk region. traj_i'(x',y',t') constrains x'y' detours associated with the risky region. The time-to-travel is predicted, t' in the traj_i'(x',y',t') change.

Figure 4:
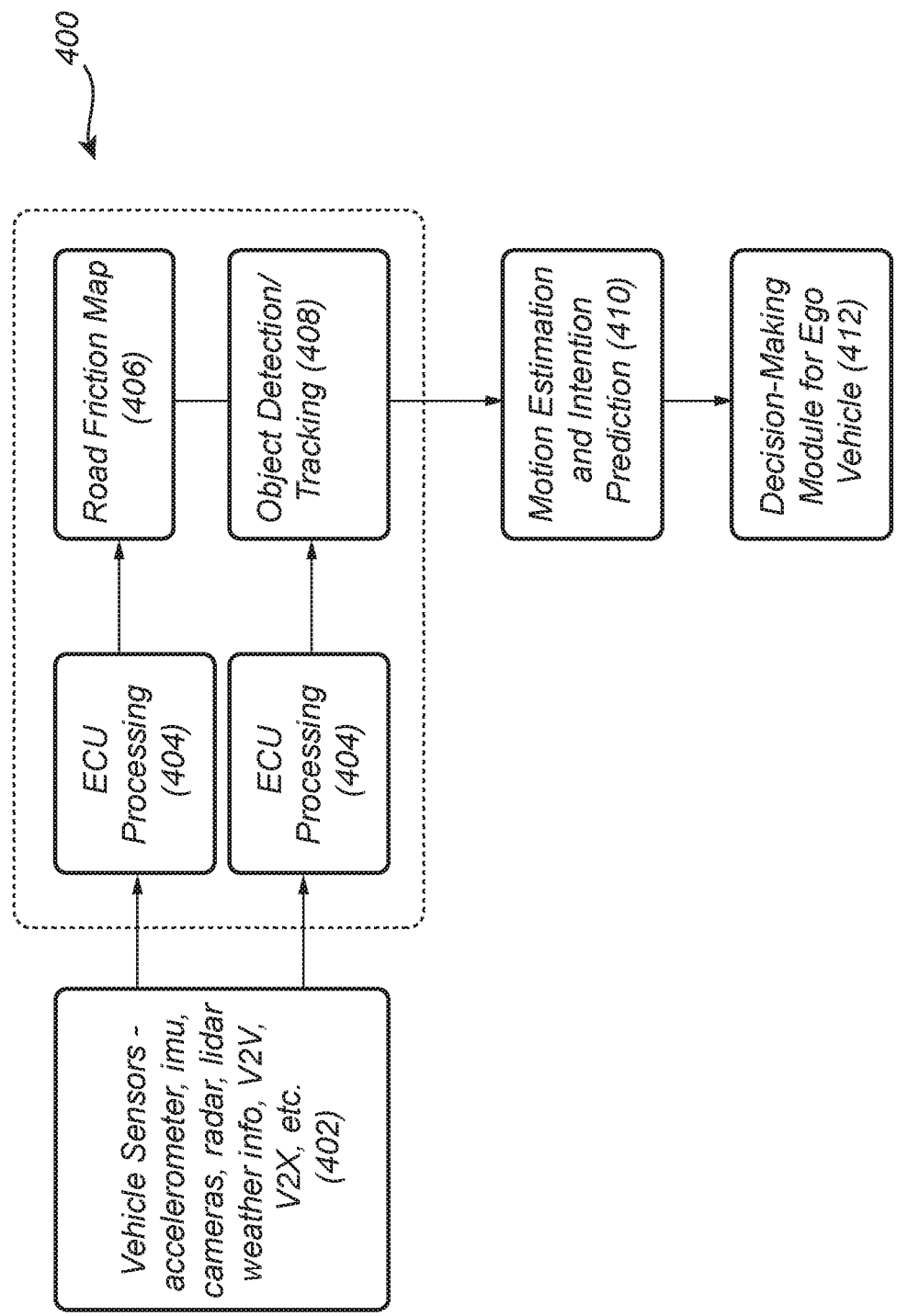
FIG. 4 is a schematic diagram of one illustrative embodiment of the road friction information-road user intention fusion system of the present disclosure.

Referring now specifically to FIG. 4, in one illustrative embodiment, the road friction information-road user intention fusion system 400 of the present disclosure includes the various vehicle sensor systems 402, such as accelerometers, IMUS, cameras, radar, lidar, AWD, V2V data, V2X data, and the like, all of which communicate with the ego vehicle ECU processing systems 404. As is known to those of ordinary skill in the art, the various vehicle sensor data may be processed by a friction estimation/prediction module 406 to generate the friction map, fr.map(x,y), that highlights potentially slippery areas surrounding the ego vehicle at time t, via a variety of conventional and novel methodologies. As is also known to those of ordinary skill in the art, the various vehicle sensor data may be processed by a real time object tracker 408 to determine both an object intention at time t, int_i(x,y,t), and an object trajectory at time t, traj_i(x,y,t), via a variety of conventional and novel methodologies. This friction map and these object intentions and trajectories feed an intention prediction module 410, that determines a predicted object intention at later time t', int_i'(x',y',t'), and a predicted object trajectory at later time t', traj_i'(x',y',t'), based on a risk, P, and a confidence metric. The friction map is also used to enhance motion planning for the ego vehicle at time t. Thus, the friction map informs both ego vehicle maneuver control and ego vehicle maneuver planning with respect to other road users, which are also affected by the friction map. All of this into a decision-making module 412 for the ego vehicle, which receives flags corresponding to vehicle sensor fidelity, etc. The decision-making module 412 ultimately informs operation of the various vehicle control systems 414 at time t+Δt<t' in any of a manual mode, a DA mode, or an AD mode.

Again, the object intention reflects the predicted intention of other road users at the applicable time, whereas the object trajectory reflects the predicted trajectory of other road users at the applicable time. The risk, P, reflects the probability that another road user is "safe" versus "risky," indicating an expected propensity to engage in significant behavior that must be accounted for. The confidence reflects a general certainty associated with the data utilized. For example, if the friction map is available to all parties, such that slippery conditions are known to all, then confidence is increased. If the friction map is available only to the ego vehicle, then confidence is decreased and other road users may be expected to act more erratically.

The friction map, fr.map(x,y), may be translated to a general riskiness grid, r(x,y), allowing risk for slippage and other erratic behavior to be accounted for, taking into account non-RFE risks as well as RFE risks (e.g., stationary potholes, debris in a road, and the like). Confidence in r(x,y) generally degrades with distance from the ego vehicle. For each object, r(x,y)+int_i(x,y,t) and traj_i(x,y,t) gives int_i' (x',y',t') and traj_i'(x',y',t'). One possible function involves a trajectory detour to account for a risk region. traj_i'(x',y',t') constrains x'y' detours associated with the risky region. The time-to-travel is predicted, t' in the traj_i'(x',y',t') change.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 5:
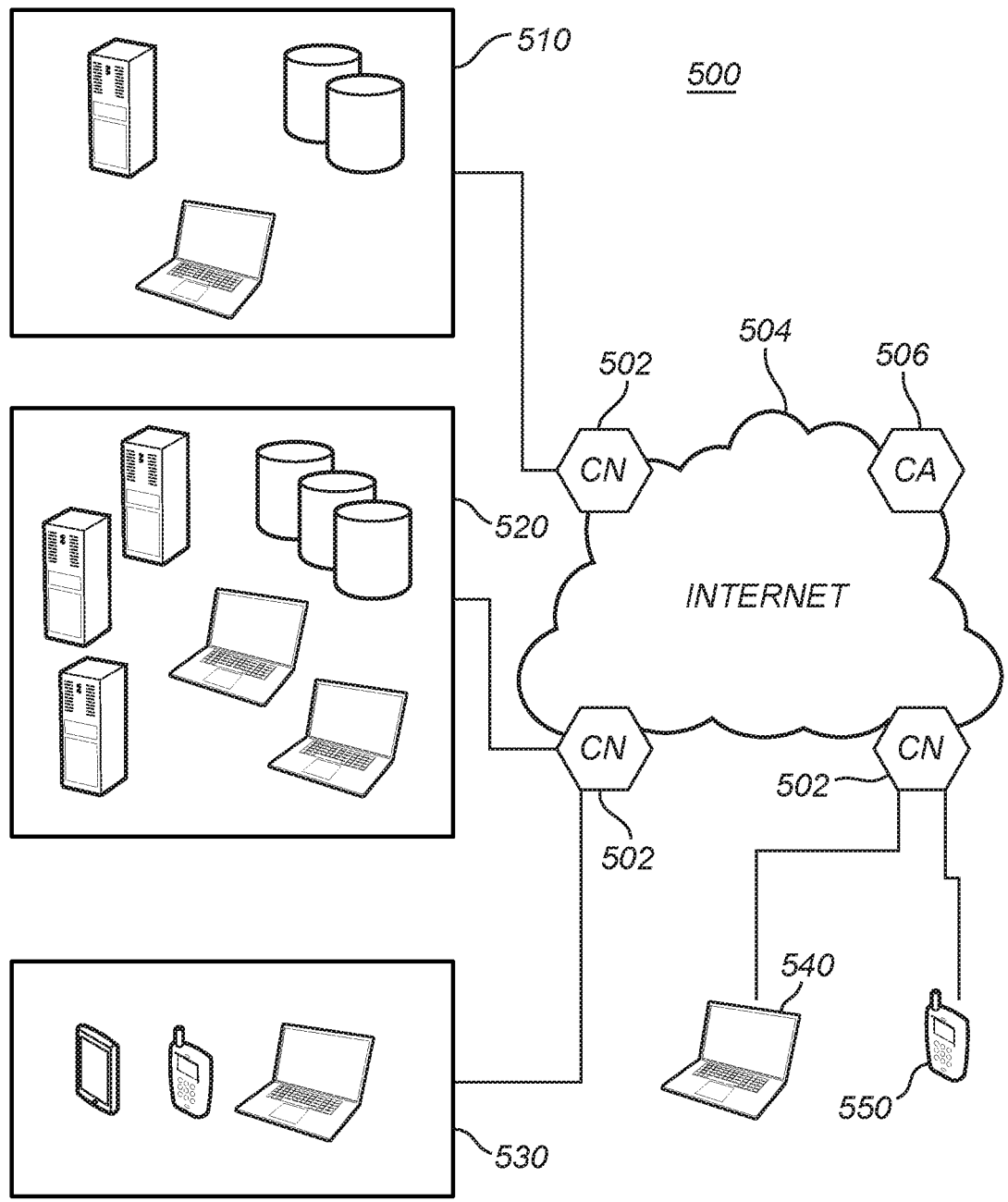
FIG. 5 is a network diagram of a cloud-based system for implementing various cloud-based services of the present disclosure.
Figure 6:
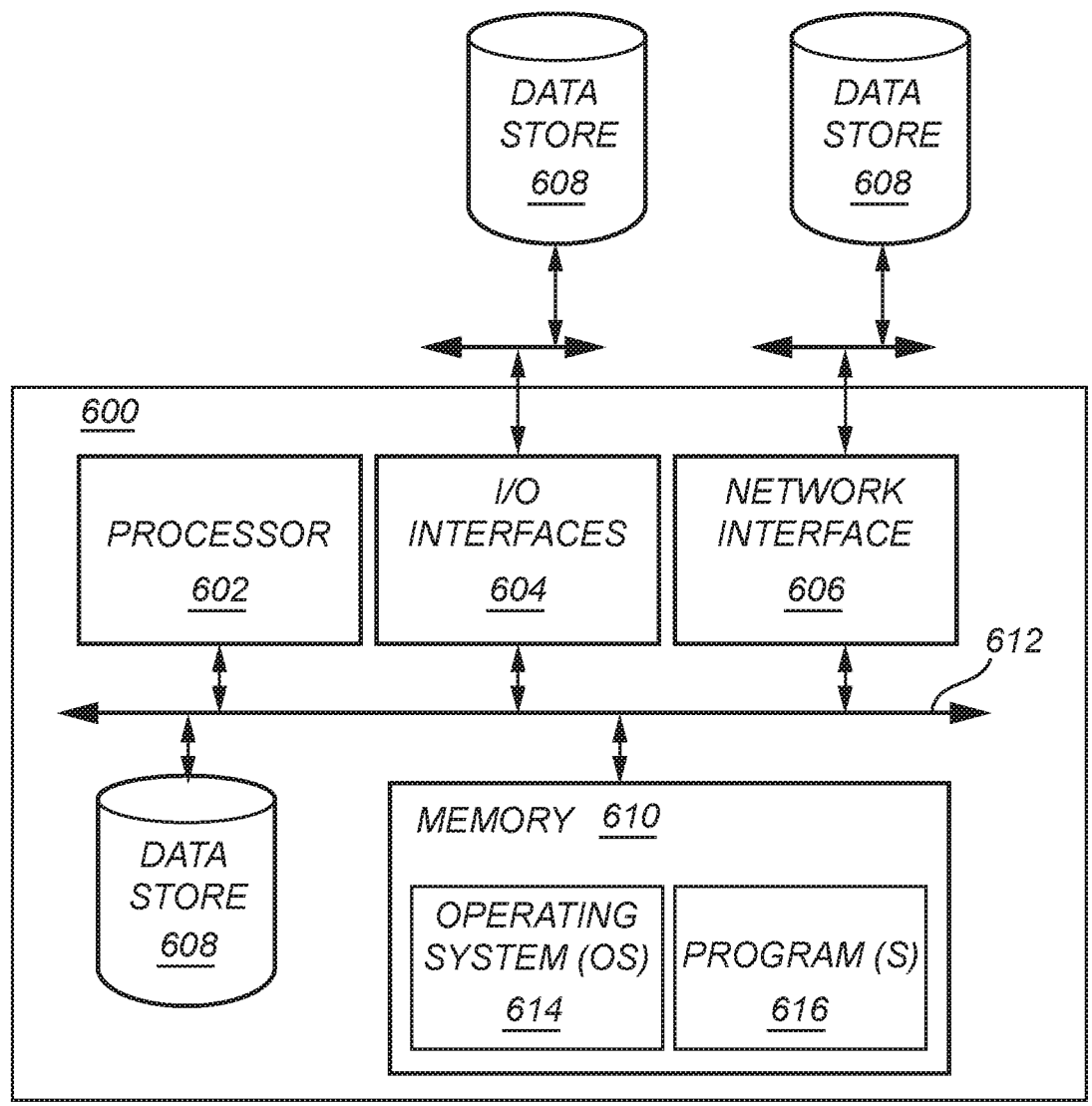
FIG. 6 is a block diagram of a server which may be used in the cloud-based system of FIG. 5 or stand-alone.

FIG. 5 is a network diagram of a cloud-based system 500 for implementing various cloud-based services of the present disclosure. The cloud-based system 500 includes one or more cloud nodes (CNs) 502 communicatively coupled to the Internet 504 or the like. The cloud nodes 502 may be implemented as a server 600 (as illustrated in FIG. 6) or the like and can be geographically diverse from one another, such as located at various data centers around the country or globe. Further, the cloud-based system 500 can include one or more central authority (CA) nodes 506, which similarly can be implemented as the server 600 and be connected to the CNs 502. For illustration purposes, the cloud-based system 500 can connect to a regional office 510, headquarters 520, various employee's homes 530, laptops/desktops 540, and mobile devices 550, each of which can be communicatively coupled to one of the CNs 502. These locations 510, 520, and 530, and devices 540 and 550 are shown for illustrative purposes, and those skilled in the art will recognize there are various access scenarios to the cloud-based system 500, all of which are contemplated herein. The devices 540 and 550 can be so-called road warriors, i.e., users off-site, on-the-road, etc. The cloud-based system 500 can be a private cloud, a public cloud, a combination of a private cloud and a public cloud (hybrid cloud), or the like.

Again, the cloud-based system 500 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 510, 520, and 530 and devices 540 and 550. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 500 is replacing the conventional deployment model. The cloud-based system 500 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 500 is illustrated herein as one example embodiment of a cloud-based system, and those of ordinary skill in the art will recognize the systems and methods described herein are not necessarily limited thereby.

FIG. 6 is a block diagram of a server 600, which may be used in the cloud-based system 500 (FIG. 5), in other systems, or stand-alone. For example, the CNs 502 (FIG. 5) and the central authority nodes 506 (FIG. 5) may be formed as one or more of the servers 600. The server 600 may be a digital computer that, in terms of hardware architecture, generally includes a processor 602, input/output (I/O) interfaces 604, a network interface 606, a data store 608, and memory 610. It should be appreciated by those of ordinary skill in the art that FIG. 6 depicts the server 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 may be, for example, but is not limited to, one or more buses or other wired or wireless connections, as is known in the art. The local interface 612 may have additional elements, which are omitted for simplicity, such as controllers, buffers (caches), drivers, repeaters, and receivers, among many others, to enable communications. Further, the local interface 612 may include address, control, and/or data connections to enable appropriate communications among the aforementioned components.

The processor 602 is a hardware device for executing software instructions. The processor 602 may be any custom made or commercially available processor, a central processing unit (CPU), an auxiliary processor among several processors associated with the server 600, a semiconductor-based microprocessor (in the form of a microchip or chipset), or generally any device for executing software instructions. When the server 600 is in operation, the processor 602 is configured to execute software stored within the memory 610, to communicate data to and from the memory 610, and to generally control operations of the server 600 pursuant to the software instructions. The I/O interfaces 604 may be used to receive user input from and/or for providing system output to one or more devices or components.

The network interface 606 may be used to enable the server 600 to communicate on a network, such as the Internet 504 (FIG. 5). The network interface 606 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 606 may include address, control, and/or data connections to enable appropriate communications on the network. A data store 608 may be used to store data. The data store 608 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 may incorporate electronic, magnetic, optical, and/or other types of storage media. In one example, the data store 608 may be located internal to the server 600, such as, for example, an internal hard drive connected to the local interface 612 in the server 600. Additionally, in another embodiment, the data store 608 may be located external to the server 600 such as, for example, an external hard drive connected to the I/O interfaces 604 (e.g., a SCSI or USB connection). In a further embodiment, the data store 608 may be connected to the server 600 through a network, such as, for example, a network-attached file server.

The memory 610 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 610 may incorporate electronic, magnetic, optical, and/or other types of storage media. Note that the memory 610 may have a distributed architecture, where various components are situated remotely from one another but can be accessed by the processor 602. The software in memory 610 may include one or more software programs, each of which includes an ordered listing of executable instructions for implementing logical functions. The software in the memory 610 includes a suitable operating system (O/S) 614 and one or more programs 616. The operating system 614 essentially controls the execution of other computer programs, such as the one or more programs 616, and provides scheduling, input-output control, file and data management, memory management, and communication control and related services. The one or more programs 616 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 7:
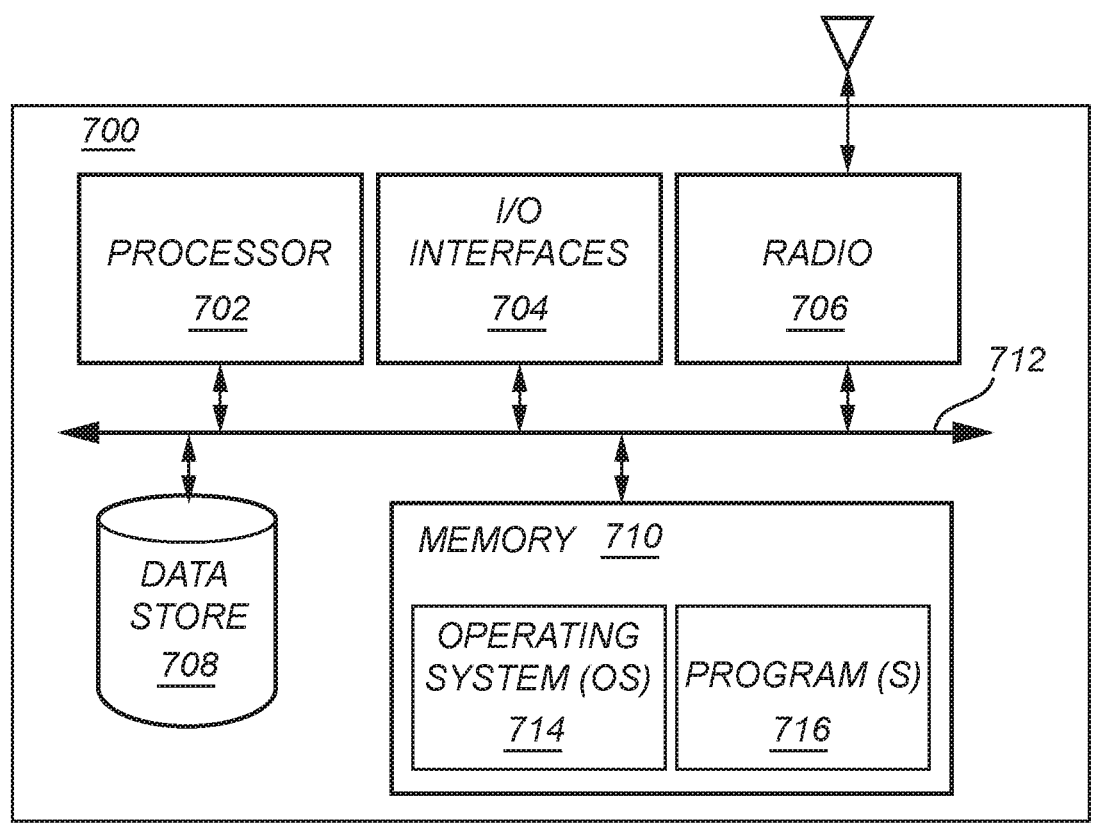
FIG. 7 is a block diagram of a user device which may be used in the cloud-based system of FIG. 5 or stand-alone.

FIG. 7 is a block diagram of a user device 700, which may be used in the cloud-based system 500 (FIG. 5), as part of a network, or stand-alone. Again, the user device 700 can be a vehicle, a smartphone, a tablet, a smartwatch, an Internet of Things (IoT) device, a laptop, a virtual reality (VR) headset, etc. The user device 700 can be a digital device that, in terms of hardware architecture, generally includes a processor 702, I/O interfaces 704, a radio 706, a data store 708, and memory 710. It should be appreciated by those of ordinary skill in the art that FIG. 7 depicts the user device 700 in an oversimplified manner, and a practical embodiment may include additional components and suitably configured processing logic to support known or conventional operating features that are not described in detail herein. The components (702, 704, 706, 708, and 710) are communicatively coupled via a local interface 712. The local interface 712 can be, for example, but is not limited to, one or more buses or other wired or wireless connections, as is known in the art. The local interface 712 can have additional elements, which are omitted for simplicity, such as controllers, buffers (caches), drivers, repeaters, and receivers, among many others, to enable communications. Further, the local interface 712 may include address, control, and/or data connections to enable appropriate communications among the aforementioned components.

The processor 702 is a hardware device for executing software instructions. The processor 702 can be any custom made or commercially available processor, a CPU, an auxiliary processor among several processors associated with the user device 700, a semiconductor-based microprocessor (in the form of a microchip or chipset), or generally any device for executing software instructions. When the user device 700 is in operation, the processor 702 is configured to execute software stored within the memory 710, to communicate data to and from the memory 710, and to generally control operations of the user device 700 pursuant to the software instructions. In an embodiment, the processor 702 may include a mobile optimized processor such as optimized for power consumption and mobile applications. The I/O interfaces 704 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 706 enables wireless communication to an external access device or network. Any number of suitable wireless data communication protocols, techniques, or methodologies can be supported by the radio 706, including any protocols for wireless communication. The data store 708 may be used to store data. The data store 708 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 708 may incorporate electronic, magnetic, optical, and/or other types of storage media.

Again, the memory 710 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 710 may incorporate electronic, magnetic, optical, and/or other types of storage media. Note that the memory 710 may have a distributed architecture, where various components are situated remotely from one another, but can be accessed by the processor 702. The software in memory 710 can include one or more software programs, each of which includes an ordered listing of executable instructions for implementing logical functions. In the example of FIG. 7, the software in the memory 710 includes a suitable operating system 714 and programs 716. The operating system 714 essentially controls the execution of other computer programs and provides scheduling, input-output control, file and data management, memory management, and communication control and related services. The programs 716 may include various applications, add-ons, etc. configured to provide end user functionality with the user device 700. For example, example programs 716 may include, but not limited to, a web browser, social networking applications, streaming media applications, games, mapping and location applications, electronic mail applications, financial applications, and the like. In a typical example, the end-user typically uses one or more of the programs 716 along with a network, such as the cloud-based system 500 (FIG. 5).

Again, the present disclosure fuses road friction information with other road user intentions to enhance safety constraint calculations and ego vehicle control and maneuvers, as implemented by DA and AD systems, thereby providing more adaptive, safer, and smoother ego vehicle control and maneuvers, in terms of steering, braking, and acceleration. The input to the methods and system of the present disclosure include predictive local road friction information, such as a RFE "map", and predictive motion trajectories of other road users, based on perception (e.g., vision) sensor-based methodologies related to object speed, trajectory, travel time, motion probabilities, slippage probabilities, etc. The output from the methods and system is a vehicle maneuver control signal with enhanced safety constraints.

Figure 8:
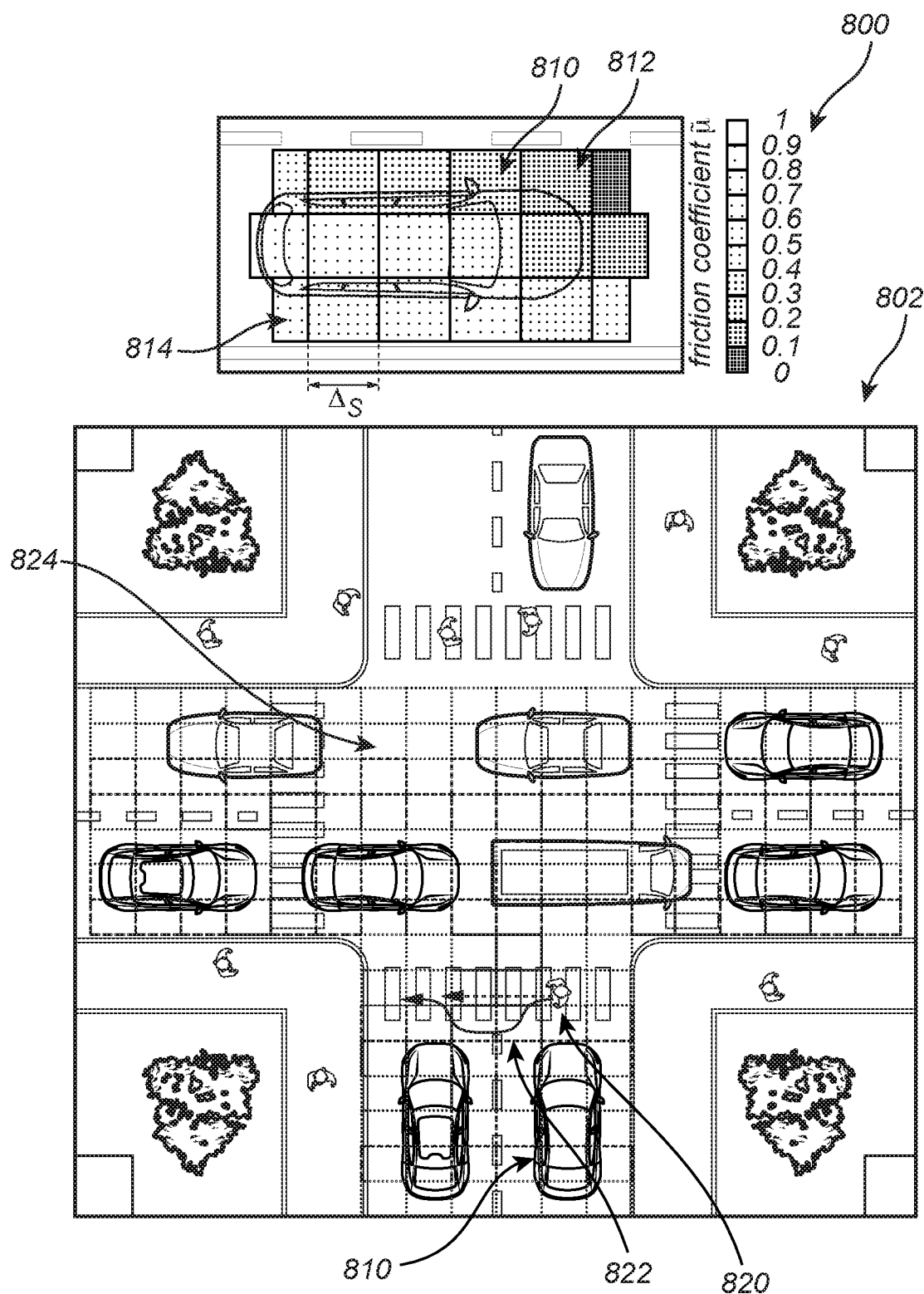
FIG. 8 is a schematic diagram of an illustrative friction map and risk map generated by the fusion systems and methods of the present disclosure, highlighting an associated vehicle trajectory modification function.

FIG. 8 is a schematic diagram of an illustrative friction map 800 and risk map 802 generated by the fusion systems and methods of the present disclosure, highlighting an associated vehicle trajectory modification function. Here, the friction map 800, generated by any conventional or novel RFE methodology, shows the ego vehicle 810 and the surrounding slippery (or risky) regions 812 and dry (or non-risky) regions 814 around the vehicle. This friction map 800 may be fused with other friction maps and/or shared with other vehicles and/or road users, increasing the confidence in all decisions made. The friction map 800 is fused with objects around the ego vehicle 810 that are being tracked. Here, a pedestrian 820 is seen crossing the road in front of the ego vehicle 810. The trajectory of the pedestrian 820 is predicted, taking into account the friction map 810, which affects both the handling of the ego vehicle 810 and the behavior of the pedestrian 820. The resulting overlay creates the risk map 802 which shows areas of high and low risk encountered by the vehicle based on the trajectories of the detected objects and the known road friction conditions. This risk map 802 is predictive and shows high-risk regions 822 and low-risk regions 824. For example, FIG. 8 shows that the pedestrian 820, normally walking a straight route through the crosswalk at a brisk pace, is predicted to encounter a slippery (i.e., low friction) portion 812 of the friction map 800, corresponding to a risky portion 822 of the risk map 802. Thus, it is predicted that the pedestrian 820 could travel more slowly or take a circuitous path through the crosswalk. Accordingly, the stopped ego vehicle 810, in an AD mode, will wait for a longer time-to-travel before beginning to accelerate and turning the corner. Similarly, in a DA or an AD mode, steering and braking could also be modified, as well as general route planning. All adjustments are made to modify ego vehicle path and time.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A method, comprising:
receiving road friction information indicating road friction estimates for a plurality of regions surrounding a vehicle;
detecting and determining a predicted trajectory for an object within the plurality of regions surrounding the vehicle;
wherein the predicted trajectory for the object is determined based in part on an object intention at time t, an object trajectory at time t, a predicted object intention a later time t', a predicted object trajectory at later time t', a risk, a confidence metric, and the road friction estimates for the plurality of regions surrounding the vehicle; and
modifying operation of the vehicle at time $t+\Delta t < t'$ based on the predicted trajectory for the object.

2. The method of claim 1, wherein receiving the road friction information comprises using the road friction estimates for the plurality of regions surrounding the vehicle to generate a road friction map of the plurality of regions surrounding the vehicle.

3. The method of claim 2, wherein the predicted trajectory for the object is further determined based in part on a probability that the object engages in safe or risky behavior, with confidence being increased if the road friction map is available to the object, decreased if the road friction map is available only to the vehicle, and decreased with distance of the object from the vehicle.

4. The method of claim 2, wherein determining the predicted trajectory for an object within the plurality of regions surrounding the vehicle comprises fusing the road friction map with an object map of the plurality of regions surrounding the vehicle to form a risk map of the plurality of regions surrounding the vehicle.

5. The method of claim 4, wherein the predicted trajectory for the object is determined based in part on the risk map for the plurality of regions surrounding the vehicle.

6. The method of claim 1, wherein detecting and determining the predicted trajectory for the object within the plurality of regions surrounding the vehicle comprises detecting the object with a perception sensor of the vehicle and determining the predicted trajectory for the object within the plurality of regions surrounding the vehicle using a machine learning algorithm.

7. The method of claim 1, wherein modifying the operation of the vehicle based on the predicted trajectory for the object comprises modifying one or more of steering, braking, acceleration, and a time-to-travel of the vehicle.

8. A non-transitory computer-readable medium comprising vehicle control instructions stored in a memory and executed by a processor to carry out the steps comprising:
  receiving road friction information indicating road friction estimates for a plurality of regions surrounding a vehicle;
  detecting and determining a predicted trajectory for an object within the plurality of regions surrounding the vehicle;
  wherein the predicted trajectory for the object is determined based in part on an object intention at time t, an object trajectory at time t, a predicted object intention a later time t', a predicted object trajectory at later time t', a risk, a confidence metric, and the road friction estimates for the plurality of regions surrounding the vehicle; and
  modifying operation of the vehicle at time t+Δt<t' based on the predicted trajectory for the object.

9. The non-transitory computer-readable medium of claim 8, wherein receiving the road friction information comprises using the road friction estimates for the plurality of regions surrounding the vehicle to generate a road friction map of the plurality of regions surrounding the vehicle.

10. The non-transitory computer-readable medium of claim 9, wherein the predicted trajectory for the object is further determined based in part on a probability that the object engages in safe or risky behavior, with confidence being increased if the road friction map is available to the object, decreased if the road friction map is available only to the vehicle, and decreased with distance of the object from the vehicle.

11. The non-transitory computer-readable medium of claim 9, wherein determining the predicted trajectory for an object within the plurality of regions surrounding the vehicle comprises fusing the road friction map with an object map of the plurality of regions surrounding the vehicle to form a risk map of the plurality of regions surrounding the vehicle.

12. The non-transitory computer-readable medium of claim 11, wherein the predicted trajectory for the object is determined based in part on the risk map for the plurality of regions surrounding the vehicle.

13. The non-transitory computer-readable medium of claim 8, wherein modifying the operation of the vehicle based on the predicted trajectory for the object comprises modifying one or more of steering, braking, acceleration, and a time-to-travel of the vehicle.

14. A system, comprising:
  a friction estimation/prediction module operable for receiving road friction information indicating road friction estimates for a plurality of regions surrounding a vehicle;
  an object detection and tracking module operable for detecting and determining a predicted trajectory for an object within the plurality of regions surrounding the vehicle;
  wherein the predicted trajectory for the object is determined based in part on an object intention at time t, an object trajectory at time t, a predicted object intention a later time t', a predicted object trajectory at later time t', a risk, a confidence metric, and the road friction estimates for the plurality of regions surrounding the vehicle using a motion estimation and intention prediction module; and
  a decision-making module operable for modifying operation of the vehicle at time t+Δt<t' based on the predicted trajectory for the object.

15. The system of claim 14, wherein receiving the road friction information comprises using the road friction estimates for the plurality of regions surrounding the vehicle to generate a road friction map of the plurality of regions surrounding the vehicle.

16. The system of claim 15, wherein the predicted trajectory for the object is further determined based in part on a probability that the object engages in safe or risky behavior, with confidence being increased if the road friction map is available to the object, decreased if the road friction map is available only to the vehicle, and decreased with distance of the object from the vehicle.

17. The system of claim 15, wherein determining the predicted trajectory for an object within the plurality of regions surrounding the vehicle comprises fusing the road friction map with an object map of the plurality of regions surrounding the vehicle to form a risk map of the plurality of regions surrounding the vehicle.

18. The system of claim 17, wherein the predicted trajectory for the object is determined based in part on the risk map for the plurality of regions surrounding the vehicle.

19. The system of claim 14, wherein detecting and determining the predicted trajectory for the object within the plurality of regions surrounding the vehicle comprises detecting the object with a perception sensor of the vehicle and determining the predicted trajectory for the object within the plurality of regions surrounding the vehicle using a machine learning algorithm.

20. The system of claim 14, wherein modifying the operation of the vehicle based on the predicted trajectory for the object comprises modifying one or more of steering, braking, acceleration, and a time-to-travel of the vehicle.

* * * * *